United States Patent [19]

Bayerl et al.

[11] Patent Number: 5,396,548
[45] Date of Patent: Mar. 7, 1995

[54] COMMUNICATION SYSTEM UTILIZING INFORMATION RECEIVED DURING A SILENT INTERVAL BETWEEN RINGING SIGNALS

[75] Inventors: Jeanne P. Bayerl, Red Bank; Paul J. O'Brien, Atlantic Highlands; Pamela A. Savage, Howell, all of N.J.

[73] Assignee: AT&T Corp., Murray Hill, N.J.

[21] Appl. No.: 27,976

[22] Filed: Mar. 8, 1993

[51] Int. Cl.[6] .................. H04M 15/00; H04M 15/06; H04M 1/00; H04M 3/42
[52] U.S. Cl. .................... 379/140; 379/142; 379/157; 379/158; 379/201; 379/202; 379/210; 379/211
[58] Field of Search ............... 379/210, 211, 112, 140, 379/141, 142, 201, 202, 158, 156, 157

[56] References Cited

U.S. PATENT DOCUMENTS

| | | | |
|---|---|---|---|
| 3,787,626 | 1/1974 | Subieta | 179/5.5 |
| 4,242,539 | 12/1980 | Hashimoto | 179/5.5 |
| 4,383,138 | 5/1983 | Castro et al. | 179/84 C |
| 4,582,956 | 4/1986 | Doughty | 179/2 A |
| 4,723,273 | 2/1988 | Diesel et al. | 379/211 |
| 4,924,496 | 5/1990 | Figa et al. | 379/142 |
| 5,103,449 | 4/1992 | Jolissaint | 379/127 X |
| 5,109,399 | 4/1992 | Thompson | 379/142 X |
| 5,109,405 | 4/1992 | Morgenstein | 379/210 X |
| 5,249,221 | 9/1993 | Ketring | 379/211 X |
| 5,268,958 | 12/1993 | Nakane | 379/142 |

Primary Examiner—Stephen Chin
Assistant Examiner—Paul Loomis
Attorney, Agent, or Firm—John A. Caccuro

[57] ABSTRACT

A communication system detects special service information (e.g., calling party identification) during a silent interval between ringing signals on an incoming call and stores the information in a call record created for the call. In response to predetermined call conditions, this information is included as part of a control signal sent over an extension loop to a station terminal. Call features such as delayed ringing, hold, call transfers, line preselect and switch hook status are utilized to control where, when and if this information should be displayed at various station terminals.

21 Claims, 6 Drawing Sheets

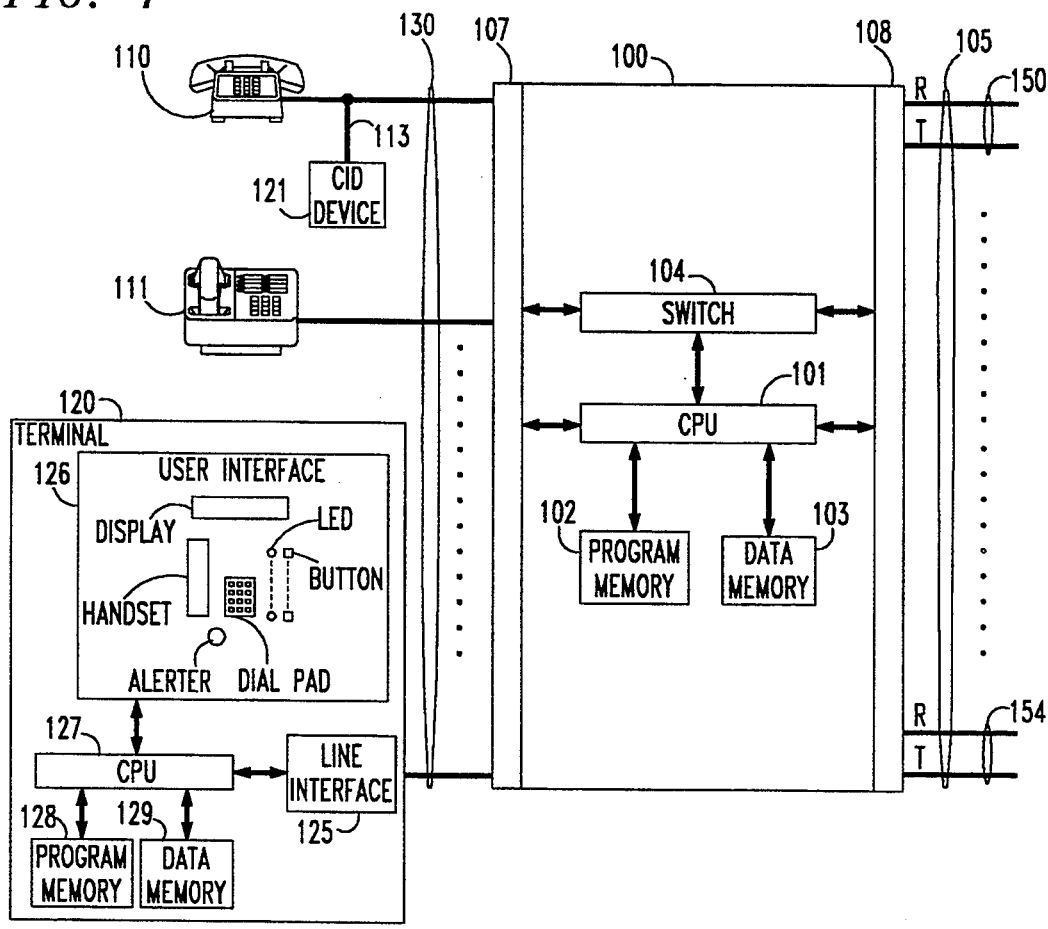
FIG. 1
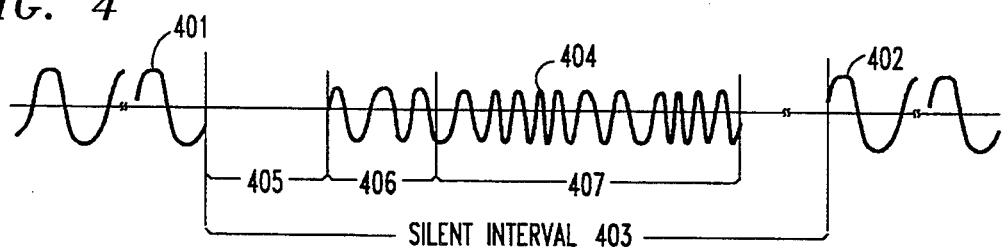
FIG. 4
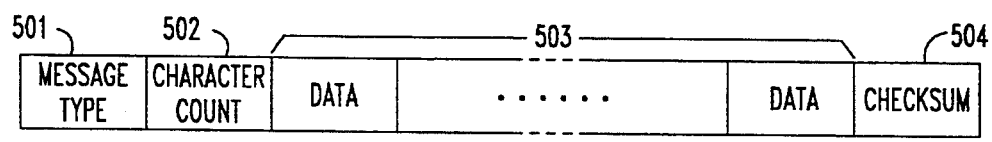
FIG. 5 MESSAGE FORMAT

FIG. 7 CALL RECORD TABLE 700

| CALL/ CO LINE NO. | LINE STATUS | CURRENT CID | CALLER NAME | DATE | TIME | MISC | ACTIVE EXTENSIONS | PROGRAMMED EXTENSIONS |
|---|---|---|---|---|---|---|---|---|
| 1 | ALERTING | 908-555-1212 | ------ | --- | --- | --- | 1-5 | 1-5 |
| 2 | IDLE | -------------- | ------ | --- | --- | --- | ------- | 1-10 |
| 3 | OUT-CALL | -------------- | ------ | --- | --- | --- | 6 | 1-10 |
| 4 | IN-CALL | 908-454-3434 | ------ | --- | --- | --- | 3,7 | 1-7 |
| 5 | TRANS-ALERT | 313-667-2222 | ------ | --- | --- | --- | 4 | 1-5 |

FIG. 8

EXTENSION STATUS TABLE 800

| EXT. | TERMINAL TYPE | SWITCHHOOK STATE | ACTIVE LINE STATUS | DISPLAY CONTENTS | CURRENT FACILITY SELECTION |
|---|---|---|---|---|---|
| 1 | ETR | ON-HOOK | LINE 1 ALERTING | 908-555-1212 | LINE 1 |
| 2 | ETR | ON-HOOK | LINE 1 ALERTING | 908-555-1212 | LINE 1 |
| 3 | ETR | OFF-HOOK | LINE 1 ALERTING INCOMING CALL ON LINE 4 | 908-454-3434 | LINE 4 |
| 4 | ETR | ON-HOOK | LINE 1 ALERTING LINE 5 TRANSFER-ALERT | 313-667-2222 | LINE 5 |
| 5 | T/R | ON-HOOK | LINE 1 ALERTING | 908-555-1212 | LINE 1 |
| 6 | ETR | OFF-HOOK | OUTGOING CALL ON LINE 3 | DATE AND DAY | LINE 3 |
| 7 | ETR | ON-HOOK | -------- | DATE AND DAY | N/A |
| 8 | T/R | OFF-HOOK | INCOMING CALL ON LINE 4 | 908-454-3434 | LINE 4 |
| 9 | ETR | ON-HOOK | -------- | DATE AND DAY | N/A |
| 10 | ETR | ON-HOOK | PRESELECTED LINE 4 | 908-454-3434 | LINE 4 |

COMMUNICATION SYSTEM UTILIZING INFORMATION RECEIVED DURING A SILENT INTERVAL BETWEEN RINGING SIGNALS

CROSS REFERENCE TO RELATED APPLICATION

Related subject matter is disclosed in co-pending application entitled "Apparatus and Method for Programming a Repertory Dial Button of a Station Terminal", filed concurrently herewith and assigned to the same assignee hereof.

TECHNICAL FIELD

This invention relates to telephone communication systems and, more particularly, to a telephone communication system which utilizes information received during a silent interval between ringing signals.

BACKGROUND OF THE INVENTION

The utilization of information received during a silent interval between ringing signals, including the Individual Calling Line Identification (hereinafter CID) number, is now being incorporated into new private or subscriber-owned communication systems (e.g., key or private branch exchanges (PBX) systems). Many private or subscriber-owned communication systems exist in which the extension number of a system calling station is transmitted to the called system station. One known subscriber-owned communication system also transmits the CID number of a network calling station to the called station between successive ringing signals.

Undesirably, however, this CID number or other information is only made available at the called station set and is unavailable once various calling features are activated, e.g., delayed ringing, call transfer, etc.

SUMMARY OF THE INVENTION

In accordance with the present invention, special service information (e.g., CID) detected on an incoming (e.g., a central office) line to a communication system during a silent interval between ringing signals is stored as part of a call record associated with the incoming line. In response to predetermined call condition(s), this special service information is included as part of a control signal sent over extension loop(s) of the system. Since this information is part of the call record information, it is readily available for use when the various system call features are activated. According to the invention, call features such as delayed ringing, hold, call transfers, line preselect, privacy, and switch hook status can be utilized to control where, when and if this information should be displayed at various station terminals.

BRIEF DESCRIPTION OF THE DRAWING

In the drawing,

FIG. 1 is a block diagram of a telephone communication system useful for describing the present invention;

FIG. 4 illustrates an idealized frequency shift keyed signal, which represents special service information, received during the silent interval between ringing signals from a telephone switching system;

FIG. 5 discloses the message character format of the special service information sent from a telephone switching system to the data receiver;

FIG. 7 shows a call record table utilized by the flow charts of FIGS. 9, 10 and 11;

FIG. 8 shows an extension status table 800 utilized by the flow charts of FIGS. 9, 10 and 11.

GENERAL DESCRIPTION

Figure 2:
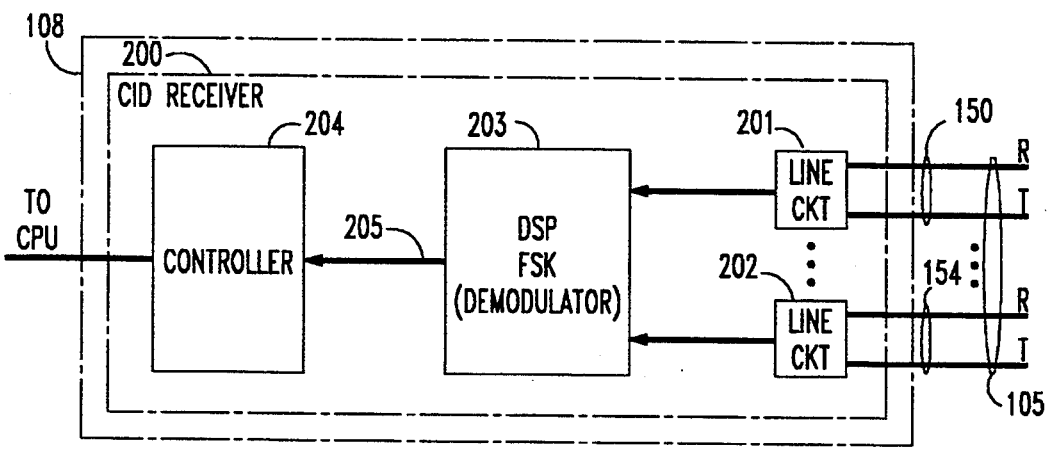
FIG. 2 shows, in block diagram form, an illustrative data receiver which is part of a line interface for receiving special service information during the silent interval between ringing signals from a telephone switching system.

Shown in FIG. 1 is an illustrative block diagram of a communication system useful for describing the operation of the present invention. The system includes common control module or unit 100 which connects to one or more central office (CO) or PBX lines 105 via interface 108 and which connects via interface 107 and loops (i.e., extensions) 130 to the plurality of station terminals such as 110–120. Illustratively, this communication system may be a Merlin ® communication system such as described in U.S. Pat. No. 4,560,837 issued to Carson et al on Dec. 24, 1985. (Merlin is a registered trademark of AT&T).

The general operation of the communication system shown in FIG. 1 is as follows. Control unit 100 establishes and controls all station set communications. Control unit 100 includes switch 104, central processor unit (CPU) 101, program memory 102 and data memory 103. Program memory 102 provides instructions to CPU 101 for controlling switch 104 and interface units 107 and 108 to enable the various communication operating features and functions of the system, including those of the present invention. Data memory 103 is utilized by CPU 101 for storing and accessing data associated with performing the various functions and features programmed in program memory 102. In one embodiment, CPU 101 is a microprocessor; program memory 102 is read-only memory (ROM); and data memory 103 is random access memory (RAM). The interface circuits 107 and 108 may include well-known circuitry such as a ring detector, network control, line circuits, and other circuitry required by the system to establish, maintain and terminate communications.

Each station terminal e.g., 120 may, illustratively, be represented as including line interface 125, user interface 126, processor (CPU) 127, program memory 128 and data memory 129. Line interface 125 includes the circuitry required to enable communications over facility 130. User interface representatively includes the handset, display, dial pad, line and feature buttons, associated Light Emitting Diode (LED) indicators, audio alerter and other well-known circuitry required to provide telephone communication at a terminal. The CPU 127 controls station terminal 120 using instructions stored in program memory 128 and data stored in data memory 129 which enables the terminal to provide the various communication features and functions, including those of the present invention. The station terminals 110–120 which operate with control unit 100 may be of two types. One type of station terminal, shown as 111, refers to an Enhanced Tip Ring (ETR) station terminal which communicates using the control signals shown in FIG. 6 and includes a display. Another type of station terminal 110 may be a conventional Tip/Ring (T/R) station terminal which does not include the display and may not include any of the feature buttons or LEDs of the ETR station set. Additionally, a well-known Tip/Ring CID device 121 may connect to extension 113 to record and display the CID signal using the control signal shown in FIG. 4.

Figure 9:
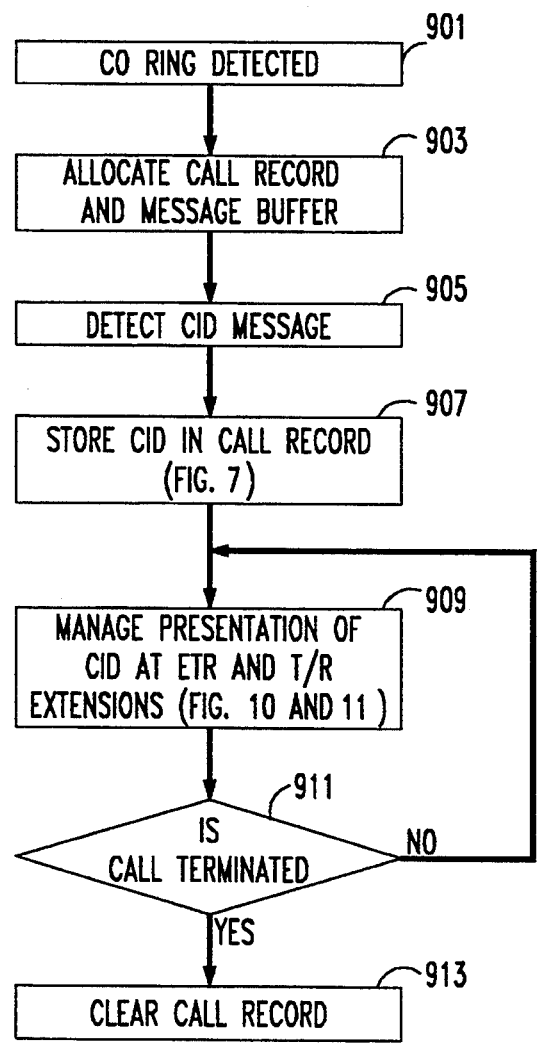
FIGS. 9, 10 and 11 show flow charts describing various features of the present invention.

Briefly, the invention operates as follows. Special service information (e.g., CID) detected on an incoming line 105 to control unit 100 during a silent interval between ringing signals (FIG. 4) is stored as part of a call record (FIG. 7) associated with the incoming line. In response to predetermined call condition(s), this special service information is included as part of a control signal (FIG. 6) sent over extension loop(s) of the system. Also, the detected CID information can be regenerated in the silent interval between ringing signals (FIG. 4) sent to T/R equipment attached to extension loops in the system to be detected and displayed by CID device 121. Since this information is part of the call record information, it is readily available for use when the various system call features are activated. According to the invention, as described in FIGS. 9 and 10, call features such as delayed ringing, hold, call transfers, line preselect, privacy, and switch hook status can be utilized to control where, when and if this information should be displayed at various station terminals.

Before proceeding with the operating description of the present invention, it should be recognized that the present invention may be utilized in other telephone communication systems. Since such systems utilize a variety of hardware and programming techniques, no attempt is made to describe in detail the hardware or programs used to control the communication system. However, the present invention must be blended into the overall structure of the system in which it is used and must be tailored to mesh with other features and operations of the system. Thus, in order to avoid confusion and to enable those skilled in the art to practice the claimed invention, this specification will describe the operation of the present invention using the block diagram of FIG. 1, the flow charts of FIGS. 9, 10 and 11, timing signals of FIG. 6 and the tables of FIGS. 7 and 8 to describe the logical steps and the various parameters required to implement the present invention.

DETAILED DESCRIPTION

Shown in FIG. 2 is a block diagram of a CID data receiver 200 which is part of line interface 108 of FIG. 1. Input leads 150 of CID receiver 200 connect, respectively, to the tip (T) and ring (R) leads of a CO or PBX line 105. CID receiver 200 comprises well known line circuits 201–202, Digital Signal Processor (DSP) 203 and controller 204 which function to receive frequency shift keyed signals during a silent interval between intermittent ringing signals originating from a telephone central office or PBX. These frequency shift keyed signals represent a data message which contains information for use by the telephone system of FIG. 1. In particular, with reference to FIG. 5, this special service information may include the directory number of the calling station (e.g., CID) which is making the call to this particular station. Also included in this information may be the caller's name, date, time or other special service indicators, alpha-numeric messages, etc.

Figure 3:
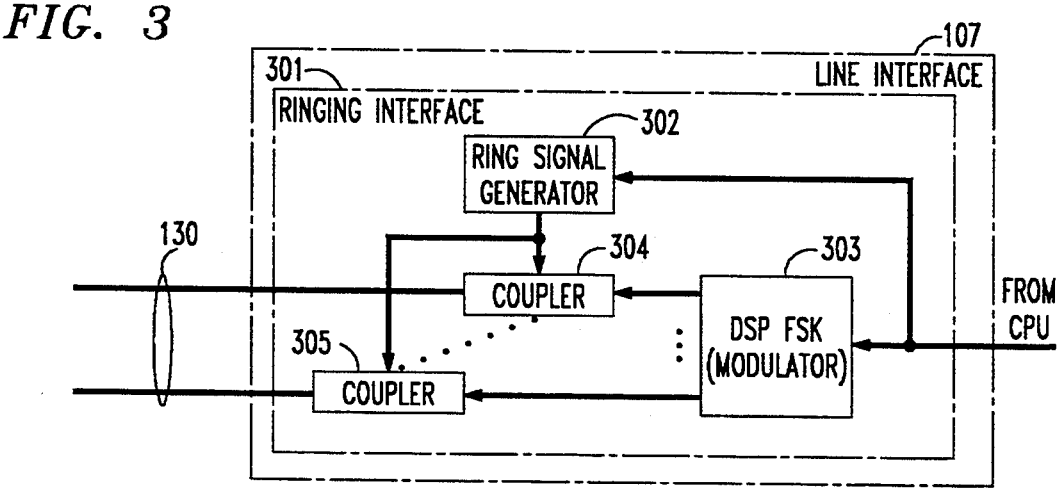
FIG. 3 shows, in block diagram form, an illustrative ring interface which is part of a line interface for generating an analog voltage ringing signal having special service information inserted in the silent interval between ringing signals.

Shown in FIG. 3 is the ring interface 301 which is part of extension interface 107. Ring interface 301 includes a ring signal generator 302 and DSP-FSK (modulator) 303 which operate under control of CPU 101. Couplers 304 and 305 couple the outputs of ring signal generator 302 and DSP 303 to the extension lines. Ring signal generator 301 generates the conventional well-known analog voltage ring signal. In response to control signals and CID data provided by CPU 101, DSP 303 generates the modulated FSK signal which is appropriately inserted in the silent interval 403 as shown in FIG. 4.

Graphically depicted in FIG. 4 are idealized intermittent ringing signals 401 and 402, plotted with respect to time, with silent interval 403 therebetween. Commonly transmitted from a telephone central office on the ring lead of the station set, ringing signals such as 401 and 402 typically comprise a 20-hertz, 86-volt RMS sinewave superimposed on minus 48 volts. Each ringing signal occurs for a time period of approximately two seconds followed by a silent interval such as 403 of approximately four seconds in duration. With a 20-hertz ringing signal, the time period of each ringing signal cycle is 50 milliseconds.

The special service information is sent as a serial data message during the first silent interval between intermittent ringing signals. A frequency shift keyed (FSK) signal such as 404 represents this data message and comprises two carrier frequencies such as 2025 and 2225 hertz which represent the low ("0") and high ("1") logic levels of the serial data message. The frequency shift keyed signal is received in a balanced manner on the tip and ring leads of the station set. This signal is transmitted from the central office in a well-known manner. As shown, frequency shift keyed signal 404 is received a short time interval, such as 405, after ringing signal 401. This short time interval lasts, for example, 400 to 450 milliseconds to allow data receiver 200 to reach a steady state condition. During time interval 406, a single frequency unmodulated FSK signal is received on the tip and ring leads of the station set to initialize data receiver 200. During subsequent time interval 407, a modulated FSK signal is received which represents the serial data message (shown in FIG. 5).

Depicted in FIG. 5 is the format of a typical data message which comprises a plurality of 8-bit characters. The first 8-bit character 501 represents the message type such as a calling station directory number, an alpha-numeric message, special service indication, etc. The second character, character count 502 represents the number of subsequent data characters contained in the message followed by check sum 504. Next, data characters 503 represent, for example, the digits of the calling station directory number, an alpha-numeric message, or any other indication which is intended to be displayed. When the data represents a directory number, each character represents a digit of the number beginning with the highest order digit of the number. Each digit may be, illustratively, encoded as an 8-bit ASCII character. The last character of the message, check sum character 504, is the two's complement of the modulo 256 total of the character bytes of the message. Thus, when all the characters of the message are totaled the sum should be zero if the message was received correctly.

Returning to FIG. 2 we describe the operation of CID receiver 108. Line circuits 201-202 receive and amplify the modulated FSK signal. DSP 203 generates a carrier detect control signal (which is used to indicate that a ring signal is detected) indicating when an FSK signal is present on the line. DSP 203 also decodes the modulated FSK signal into a serial bit stream as shown in FIG. 4. DSP 203 outputs the serial bit stream data in 8-bit byte words over bus 205. The output data messages from DSP 203 to controller 204 include data 503 (e.g., CID) as well as the identification of the ringing CO line (e.g., line 150). Controller 204 receives the data messages, validates their contents, and passes the information via bus to CPU 101. Based on specific conditions, the CPU 101 retrieves the data messages from data memory 103, converts them into the message format, shown in FIG. 6, for communication with station terminal 120. The CPU 101 stores the data messages in data memory 103 and retrieves the data messages when needed.

Illustratively, CID receiver 108 may also be implemented as described in U.S. Pat. No. 4,582,956 entitled "Method and Apparatus for Displaying at a Selected Station Special Service Information During a Silent Interval Between Ringing" which issued to C. A. Doughty on Apr. 15, 1986 which description is incorporated by reference herein.

Figure 6:
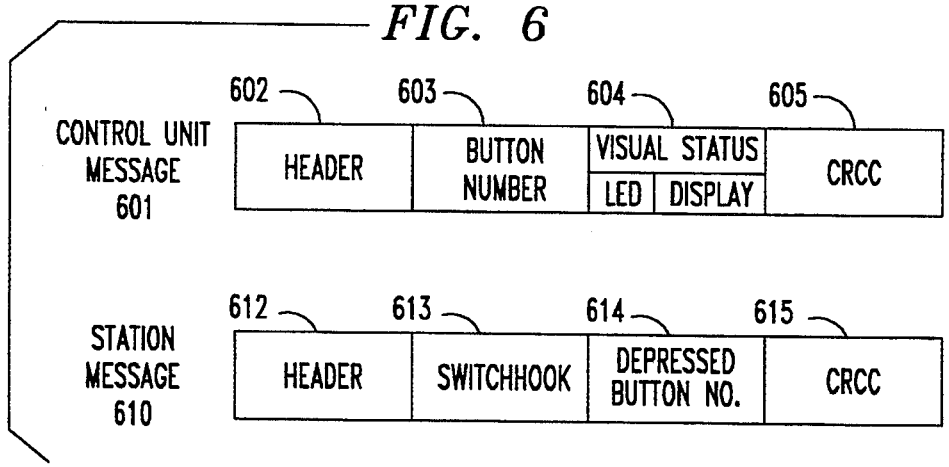
FIG. 6 describes the format of control messages sent between the control unit and terminal of the telephone communication system shown in FIG. 1.

With reference to FIG. 6 we describe, illustratively, the Merlin system control messages which are sent between control unit 100 and station terminals 110, 111-120. Control unit 100 sends messages to station terminals in the format shown in 601. The control unit transmitted message 601 includes a header 602, button number 603, visual status field 604, including LED and display data fields, and error correcting code 605. Station terminals communicate with control unit 100 using the message format shown in 610. The station transmitted message 610 includes a header 612, a switch hook field 613, a depressed button number field 614 and an error correcting code field 615.

With reference to FIG. 7 we describe an illustrative call record table 700 utilized to store the special service information (e.g., CID, caller name, date, time or other data) in accordance with the present invention. Call record table 700 includes a number of columns including call line number 701, line status 702, current CID 703, caller name 704, date 705, time 706, miscellaneous 707, programmed extensions 709 (extensions which have direct access to the line) and active extensions 708 (extensions at which the current line status applies). For our example, the communication system shown in FIG. 1 is assumed to have 5 CO lines (105) and 10 extensions (130). As shown in columns 701, each of the incoming CO lines (105), illustratively 1-5, have a separate row entry.

Call record table 700 shows a variety of line status conditions (column 702) at various CO lines, (column 701 ) to illustrate the various operating features of the present invention. Before describing how the call states of the call record table 700 are generated in FIGS. 9, 10 and 11, we briefly describe what call condition they represent. The CO line is shown to be in an alerting state (column 702) at extensions 1-5 (column 708) with a call originating from 908-555-1212 (column 703). Each loop extension 1-5 connects one or more of station terminals 110-130 each station being programmed to have direct access to line 1 (column 709). No other call information is available for this call, therefore columns 704-707 are blank. The CO line 2 of column 701 is shown to be in an idle state, in column 702, and hence no CID exists in column 703. The CO line 2 is programmed, column 709, to be directly accessed at extensions 1-10. Since CO line 2 is not active, column 708 is blank. The CO line 3, at column 701, is shown to be active on an outgoing call, column 702, and hence no CID exists in column 703. Column 709 shows that extensions 1-10 are programmed to have direct access to line 3, but column 708 shows that only extension 6 is connected to the line (i.e., active on the call). The CO line 4 of column 701 is shown to be active with an incoming call (column 702) originating from 908-454-3434 (column 703) with no other call information (columns 704-707). Column 709 shows that extensions 1-7 are programmed to have direct access to CO line 4; column 708 shows that extensions 3 and 7 are active on CO line 4. The CO line 5 of column 701 is shown to be alerting as a transferred call, column 702, with CID 313-667-2222 in column 703 and no other call information (columns 704-707). The CO line 5 is shown to be programmed for direct access at extensions 1-5, column 709, with the line transfer-alerting at extension 4, column 708.

With reference to FIG. 8, we describe an illustrative extension status table 800. This table 800 uses the information from Table 700 along with additional information about the configuration of the system. The extension status table 800 includes a plurality of columns including extension 801, station terminal type 802, switch hook status 803, active line status 804, display contents 805 and current facility selection (CFS) 806. As shown in column 801, each extension has its own row of entries. The entries for each extension are consistent with our example entries shown in call record table 700. Column 802 shows which of the station terminal types 110-120 are connected to each extension, with ETR station terminal being of type 120 and T/R station terminal being of type 110. In our example, extensions 5 and 8 are shown to be T/R station terminals with the others being ETR station terminals. Column 803 indicates whether the extension is currently on-hook or off-hook. Column 804 shows the status of any of the lines programmed for direct access from the extensions that are currently active (i.e., extension is shown in column 708). Column 805 shows the information being sent from the system to be displayed at the extension. Column 806 shows the CFS for the extension. When a line is listed as the CFS for an extension in column 806, the CID from column 703, for that line, if any, will be the display contents in column 805. If the CFS is a line with no CID in column 703, or if there is no CFS for an extension (i.e. N/A in column 806), the display contents may be blank or show some other information, in this example the current date and day. The CFS for an extension may either be determined by the system, using a feature such as ringing line preference, or by a user pressing a button or changing the switch hook status at an extension.

In the example, extensions 1, 2 and 5 are on-hook with line 1 alerting (column 804). Since the CFS is set to line 1 for all three extensions (column 806), the display at the extensions is the CID, 908-555-1212, from 703 for line 1. At extension 3, the extension is off-hook connected to an incoming call on line 4 and is also alerting for line 1 (column 804). Since the CFS at extension 3 is set for line 4 (column 806), the CID, 908-454-3434 from 703 for line 4 is on the display. At extension 4, the extension is on-hook (column 803) with line 1 alerting and line 5 alerting as a transferred call (column 804). Since the CFS is line 5 (column 806), the CID, 313-667-2222 from column 703 for line 5 is displayed at the extension. At extension 6, the extension is off-hook (column 803) on an outgoing call on line 3 (column 804). The CFS is set for line 3 (column 806) and since there is no CID in column 703 for line 3, the display shows the current date and day. Both extensions 7 and 9 are on-hook (column 803) and have no active lines (column 804). Therefore, their displays also show the date and day (column 805). Extension 8 is off-hook (column 803) on the incoming call on line 4 (along with extension 3). Since its CFS is line 4 (column 806), the display shows the CID, 908-454-3434, from column 703 for line 4. Extension 10 is on-hook (column 803), but has pressed the line button for line 4 (preselected) and thus requested line 4 as the CFS (columns 804 and 806). Since the CFS is line 4 (column 806), the display shows the CID, 908-454-3434, from column 703 for line 4.

With joint reference to FIGS. 6–10, we describe the detailed operation of the present invention. In step 901 of FIG. 9, CO ringing is detected on one or more of the central office lines 150. Assume that central office line 1 was ringing, then in step 903 control unit 100 would allocate a call record and message buffer, 720, as shown in call record table 700. In step 905, CID receiver 200 detects the CID message and other associated information during the silent interval of the ringing signal. In step 907, control unit 100 stores the CID and other information in the call record, 720, for CO line 1 at columns 704–707 in call record table 700.

Figure 10:
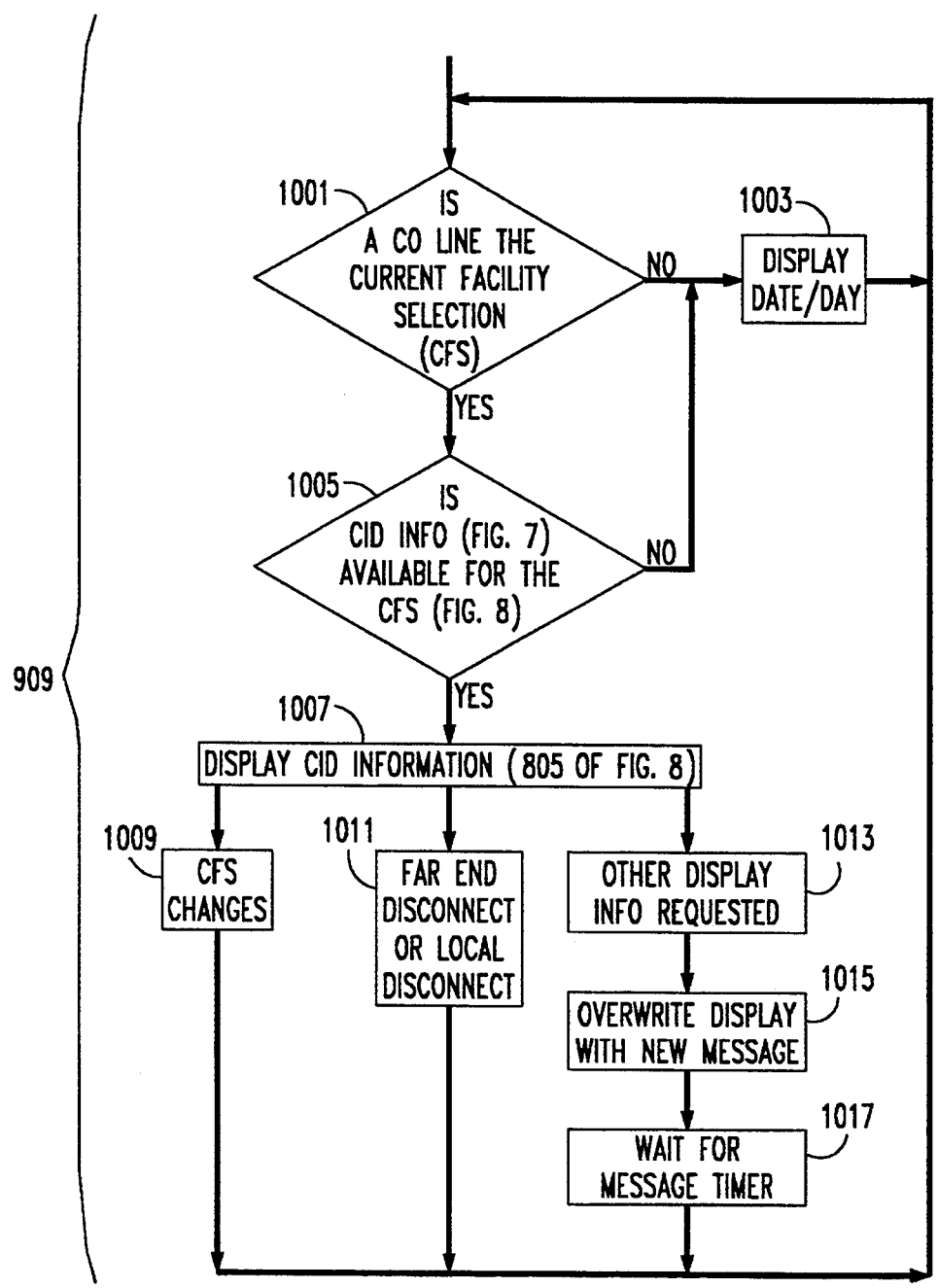
Figure 11:
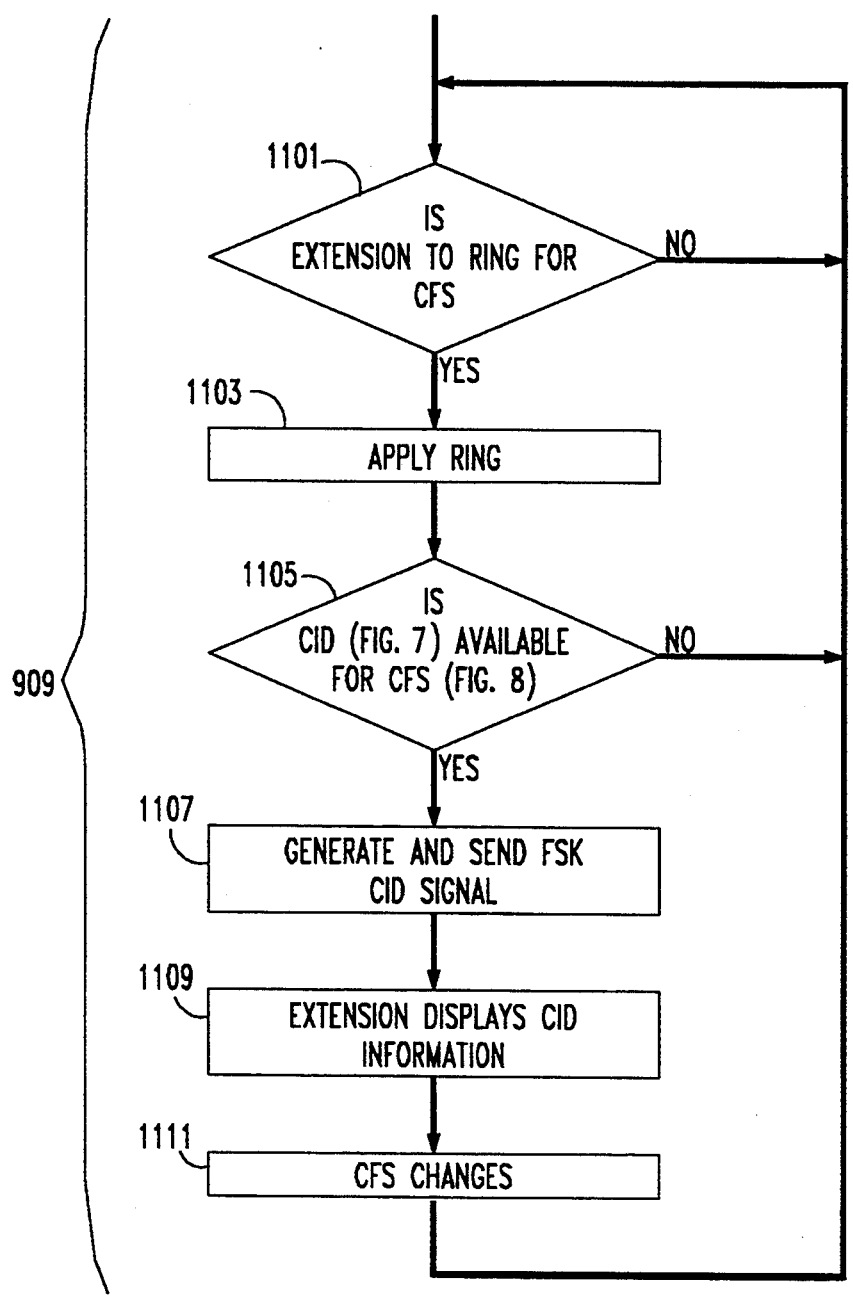

In step 909, control unit 100 determines for each extension how to manage the presentation of CID information depending upon the type of extension (ETR, TR, or both) and the extension's current states. FIGS. 10 and 11 depict the management of ETR extensions and tip ring extensions, respectively. In step 911, it is determined if the call is terminated. If the call has not been terminated, control returns to step 909. If the call has been terminated, then in step 913 the call record is cleared.

With reference to FIG. 10 we describe in more detail how to manage the presentation at ETR station terminals which was previously discussed in step 909. In block 1001 a check is made to determine whether the current facility selection (CFS) is a CO line. If it is not a CO line then in step 1003 the date and day is displayed on the ETR station terminal and control returns to step 1001. If it is a CO line then in step 1005 it is determined if the CID information, from table 700, is available for the CFS selection in table 800. If it is not available, then the previously described step 1003 is performed. If the CID information is available then, in step 1007, it is displayed at the ETR station terminal.

Subsequently, in step 1009 it is determined whether there have been changes in the station terminals CFS. If there has been a change, control returns to step 1001 to update the display information for the changed CFS. Illustrative CFS changes may include placing the CFS on hold, an update of the CFS due to ringing line preference, or a change in the CFS due to a user's line selection, a call transfer, or a call conference connection. Thereafter, in step 1011 the system determines if the far end station has disconnected or this ETR station terminal has disconnected. If either the far end or the local terminal has disconnected control returns to step 1001. If there has been no disconnect in step 1013 it is determined if other display information has been requested by the station terminal user. When that time expires control returns to step 1001. One example of a new message display may be when a user dials using dial-pad buttons and the system displays the numbers dialed at the user's terminal.

With reference to FIG. 11 we describe the procedure for managing display presentations at T/R station terminals. In step 1101, it is determined if the T/R station terminal is set to ring for CFS. If it is not, then control remains in step 1101. If the station set is to ring for CFS then, in step 1103, a ringing signal is applied to that station terminal. Thereafter, in step 1105 it is determined if CID (in table 700) is available for CFS in table 800. If not, then control returns to step 1101; otherwise, in step 1107, the FSK modulator 303 generates and sends an FSK CID signal via the protocol FIG. 4. In step 1109, the T/R station terminal displays the CID information. In certain embodiments, the T/R station terminal would include a display integral to the station set. In other embodiments, a display adjunct (such as illustrated by 113 of FIG. 1) would share the T/R station terminal loop and be utilized to display the CID information. If there is a change in the CFS, step 1111, then control is returned to step 1101. If there is no change in the CFS, control returns to step 1109.

According to another aspect of the present invention, the previouslydescribed display presentation for step 909 may be performed simultaneously at both an ETR station terminal (shown by 111 of FIG. 1 and described in FIG. 10) and T/R station (shown by 110 of FIG. 1 and described in FIG. 11) which share the same station loop.

While the present invention sends the special service information (e.g., CID) as part of a display message to a station terminal, this information could, more generally, be included as part of any control signals communicated to the station terminals. While the invention has been described as utilized with a Merlin communication system it may be adapted to programs, tables, control message formats, and operating features of other types of communication systems.

What has been described is merely illustrative of the application of the principles of the present invention. Other arrangements and methods can be implemented by those skilled in the art without departing from the spirit and scope of the present invention.

We claim:

1. A communication system for switchably controlling connections between a plurality of external communication lines and one or more system extension loops which connect to the system; said system comprising table means for associating each of said plurality of lines with at least one extension loop of said system, means for detecting information in a silent interval between ringing signals of an incoming call received over a first one of said lines, means for storing said information in a call record established for said call prior to said call being answered, means responsive to a predetermined call condition at said system for sending at least a portion of said stored information as part of an output control signal sent over an extension loop, and wherein said system in response to a line identification signal accesses said table means to select at least one extension loop of said one or more extension loops which is to receive said control signal.

2. The system of claim 1 wherein said control signal includes said information portion encoded as a display signal.

3. The system of claim 2 wherein said system sends a clear display signal over said extension loop in response to a input signal received over said extension loop.

4. The system of claim 3 wherein said received input signal from said extension loop indicates a request that an active call on said first line be placed on hold.

5. The system of claim 3 wherein said received input signal from said extension loop indicates a request to transfer an active call on said extension loop.

6. The system of claim 1 wherein when said system has an active call on said extension loops, said system is responsive to a received transfer control signal from said extension loops for transferring said active call to a second extension loop and further is responsive to an off-hook control signal from said second extension loop for sending a display control signal over said second extension loop.

7. The system of claim 1 wherein when said system has an active call on said extension loops, said system is responsive to a received first line pick up control signal followed by an off-hook control signal from a second extension loop for sending a display signal over said second extension loop.

8. A communication system for switchably controlling connections between a plurality of external communication lines and one or more system extension loops which connect to the system; said system comprising
means for detecting information in a silent interval between ringing signals of an incoming call received over a first one of said lines,
means for storing said information in a call record established for said call prior to said call being answered,
means responsive to a predetermined call condition at said system for sending at least a portion of said stored information as part of an output control signal sent over an extension loop, and
wherein said call condition is an expiration of a delayed ring state established to delay the sending of a ring control signal, representing said ringing first line, over said extension loop.

9. The system of claim 1 wherein said control signal is used to regenerate an analog ringing signal including said information portion outputted in a silent interval between rings.

10. A method of operating a communication system for switchably controlling connections between a plurality of external communication lines and one or more system extension loops which connect thereto; said method comprising the steps of
detecting information in a silent interval between ringing signals of an incoming call received over a first one of said lines,
storing said information in a call record established for said call prior to said call being answered,
in response to a predetermined call condition at said system, sending at least a portion of said stored information as part of a control signal sent over an extension loop, and
wherein said call condition is an expiration of a delayed ring state established to delay the sending of a ring control signal representing said ringing first line over said extension loops.

11. A method of operating a communication system for switchably controlling connections between a plurality of external communication lines and one or more system extension loops which connect thereto; said method comprising the steps of
associating each of said plurality of lines with at least one extension loop of said system in a table means,
detecting information in a silent interval between ringing signals of an incoming call received over a first one of said lines,
storing said information in a call record established for said call prior to said call being answered,
in response to a predetermined call condition at said system, sending at least a portion of said stored information as part of a control signal sent over an extension loop, and
in response to a line identification signal, accessing said table means to select at least one extension loop of said one or more extension loops which is to receive said control signal.

12. The method of claim 11 wherein said control signal includes said information portion encoded as a display signal.

13. The method of claim 12 further including the step of
in response to a control signal received over said extension loops, sending a clear display signal over said extension loops.

14. The method of claim 13 wherein said received control signal from said extension loops indicates a request that an active call on said first line be placed on hold.

15. The method of claim 13 wherein said received control signal from said extension loops indicates a request to transfer an active call on said extension loops to another extension loop.

16. The method of claim 11 further including the steps of
in response to an active call on said extension loops and to a received transfer control signal from said extension loops,
transferring said active call to a second extension loop and
in response to an off-hook control signal from said second extension loop, sending a display control signal over said second extension loop.

17. The method of claim 11 further including the step of
in response to an active call on said first line and to a received first line pick up control signal followed by an off-hook control signal from a first extension loop, sending a display signal over said first extension loop.

18. The method of claim 11 wherein said control signal is a system generated analog ringing signal including said information portion outputted in a silent interval between rings.

19. A communication system, including a controller, for switchably controlling connections between a plurality of external communication lines and one or more station terminals which connect thereto over extension loops, said system comprising
at said controller,
table means for associating each of said plurality of lines with at least one extension loop of said system, means for detecting information in a silent interval between ringing signals of an incoming call received over a first one of said lines, means for storing said information in a call record established for said call prior to said call being answered, means responsive to a predetermined call condition at said system for sending at least a portion of said stored information as part of an output control signal sent over an extension loop to a station terminal, and wherein said system, in response to a line identification signal, accesses said table means to select at least one extension loop of said one or more extension loops which is to receive said control signal, and said station terminal including means for receiving and displaying said information portion of a received output control signal.

20. The system of claim 19 wherein said station terminal is a digital station terminal having display means and said control signal includes said information portion sent as a display signal for display at said digital display station terminal.

21. The system of claim 19 wherein said terminal is an analog station terminal and said controller regenerates an analog ringing signal, including said information portion outputting in a silent interval between rings, which is sent to said analog station terminal.

* * * * *